(12) United States Patent
Lang (10) Patent No.: US 12,184,022 B2
(45) Date of Patent: Dec. 31, 2024

(54) CONNECTION HEAD PIECE FOR CONTACTING AN INSULATED DISCHARGE LINE IN EXTERNAL LIGHTNING PROTECTION

(71) Applicant: DEHN SE, Neumarkt i.d.OPf. (DE)

(72) Inventor: Johanna Lang, Deining (DE)

(73) Assignee: DEHN SE, Neumarkt i.d.OPf. (DE)

( * ) Notice: Subject to any disclaimer, the term of this patent is extended or adjusted under 35 U.S.C. 154(b) by 445 days.

(21) Appl. No.: 17/599,174

(22) PCT Filed: Mar. 25, 2020

(86) PCT No.: PCT/EP2020/058288
§ 371 (c)(1),
(2) Date: Sep. 28, 2021

(87) PCT Pub. No.: WO2020/207799
PCT Pub. Date: Oct. 15, 2020

(65) Prior Publication Data
US 2022/0166152 A1 May 26, 2022

(30) Foreign Application Priority Data

Apr. 10, 2019 (DE) .......................... 102019109508.5
Jul. 22, 2019 (DE) .......................... 102019119789.9

(51) Int. Cl.
*H01R 4/66* (2006.01)
*H01R 4/48* (2006.01)
(Continued)

(52) U.S. Cl.
CPC ................. *H01R 4/66* (2013.01); *H01R 4/48* (2013.01); *H01R 4/4848* (2023.08); *H01R 4/643* (2013.01); *H01R 11/28* (2013.01); *H01R 4/4821* (2023.08)

(58) Field of Classification Search
CPC ......... H01R 11/11; H01R 11/28; H01R 4/305; H01R 13/58; H01R 13/5804;
(Continued)

(56) References Cited

U.S. PATENT DOCUMENTS

| 4,839,473 A | 6/1989 | Fox et al. ................ 174/138 F |
| 5,107,077 A | 4/1992 | Fox et al. ................ 174/138 F |

(Continued)

FOREIGN PATENT DOCUMENTS

| DE | 3783549 T2 | 8/1993 | ........... H01R 13/523 |
| DE | 102013000194 B4 | 7/2017 | ............... H01R 4/66 |

(Continued)

OTHER PUBLICATIONS

Notification Concerning Transmittal of International Preliminary Report on Patentability (Chapter I of the Patent Cooperation Treaty), in English, dated Oct. 21, 2021, which was issued by the International Bureau of WIPO in Applicant's corresponding international PCT application having Serial No. PCT/EP2020/058288, filed on Mar. 25, 2020.

(Continued)

*Primary Examiner* — Renee S Luebke
*Assistant Examiner* — Paul D Baillargeon
(74) *Attorney, Agent, or Firm* — Bodner & Bodner, PLLC; Christian P. Bodner; Gerald T. Bodner (57) ABSTRACT

The invention relates to a connection head piece for contacting an insulated down conductor in the external lightning protection, comprising a sleeve having an axially extending first inner diameter section adjusted to the outer diameter or cross-section of the insulated down conductor for receiving one end of the insulated down conductor, and having a second inner diameter section extending axially adjacent thereto and adjusted to the outer diameter or cross-section of a stripped, exposed conductor end of the insulated down (Continued)

conductor, and means for fastening the stripped, exposed conductor end in the second inner diameter section. According to the invention, a static friction-generating means is formed in the first inner diameter section of the sleeve and flexibly projects into the interior of the sleeve such that a nonpositive connection is established between an outer sheath of the insulated down conductor and the sleeve upon insertion of the down conductor.

12 Claims, 5 Drawing Sheets

(51) Int. Cl.
*H01R 4/64* (2006.01)
*H01R 11/28* (2006.01)

(58) Field of Classification Search
CPC .............. H01R 13/582; H01R 13/5825; H01R 13/5829; H01R 13/595; H01R 4/34; H01R 4/36; H01R 4/2445
See application file for complete search history.

(56) References Cited

U.S. PATENT DOCUMENTS

| | | | |
|---|---|---|---|
| 7,914,342 B2* | 3/2011 | Chen ...................... | H01R 13/05 439/669 |
| 9,768,549 B1* | 9/2017 | Chen ....................... | H01R 4/38 |

FOREIGN PATENT DOCUMENTS

| | | | |
|---|---|---|---|
| DE | 202018101038 U1 | 3/2018 | ............... H01R 4/30 |
| EP | 0261888 A2 | 3/1988 | ........... H01R 31/523 |
| EP | 3062397 A1 | 8/2016 | ............. H01R 11/05 |
| GB | 2148057 A | 5/1985 | ............. H01R 31/06 |

OTHER PUBLICATIONS

English translation of the International Preliminary Report on Patentability (Chapter I of the Patent Cooperation Treaty), dated Sep. 28, 2021, which was issued by the International Bureau of WIPO in Applicant's corresponding international PCT application having Serial No. PCT/EP2020/058288, filed on Mar. 25, 2020.

Written Opinion of the International Searching Authority, in English, dated May 29, 2020, which was issued by the International Bureau of WIPO in Applicant's corresponding international PCT application having Serial No. PCT/EP2020/058288, filed on Mar. 25, 2020.

International Search Report, in English, dated May 29, 2020, which was issued by the International Bureau of WIPO in Applicant's corresponding international PCT application having Serial No. PCT/EP2020/058288, filed on Mar. 25, 2020.

Dehn + Söhne GmbH + Co. KG, "*HVI® Conductor Installation Manual*", Publication No. 1841, p. 6, Figure 1 and p. 16, Figure 3, Jun. 2014.

* cited by examiner

CONNECTION HEAD PIECE FOR CONTACTING AN INSULATED DISCHARGE LINE IN EXTERNAL LIGHTNING PROTECTION

The invention is based on a connection head piece for contacting an insulated down conductor in the external lightning protection, comprising a sleeve having a first, axially extending inner diameter section adjusted to the outer diameter or cross-section of the insulated down conductor for receiving one end of the insulated down conductor, and having a second inner diameter section extending axially adjacent thereto and adjusted to the outer diameter or cross-section of a stripped, exposed conductor end of the insulated down conductor, and means for fastening the stripped, exposed conductor end in the second inner diameter section.

A device for contacting a field control layer of an insulated down conductor in the external lightning protection is previously known from DE 10 2013 000 194 B4. The insulated down conductor is guided at least over a length section in the interior of a support body or a support tube to be spaced apart therefrom. Furthermore, a conductive connection element is present, which is connected, on the one hand, to the field control layer and, on the other hand, to a potential equalization means, and wherein the connection element is located in the spacing area between the insulated down conductor and the interior of the support body or support tube or can be introduced in this spacing area.

The connection element itself is configured in one piece and has a plurality of arms or fingers which are under mechanical pretension or spring force and which reach the down conductor at the surface of the field control layer of the insulated installation. In this type of configuration for contacting the field control layer, it is ensured that no damage to the field control layer occurs during assembly. The assembly process can be realized quickly and intuitively using the described device and can be carried out largely without tools.

In DE 10 2013 000 194 B4, it remains open how the insulated down conductor is received in the upper area at a contact head piece, and how it is contacted and mechanically fixed there.

The installation instructions for HVI® conductor based on DEHN+SÖHNE GmbH+Co. KG (see http://www.dehn.de/dehnacademy) shows that the insulation of the insulated down conductor, i.e. of the HVI® conductor, must first be removed for mounting the head piece or the connection element.

After removal of the insulation, the head piece or connection element is mounted or preassembled on the conductor ends of the HVI® conductor. The head piece or connection element has to be linked up to the HVI® conductor and to be screwed on the respective conductor end as far as possible by clockwise rotation. For support, an open end wrench may be applied to an existing wrench face of the head piece or to the connection element.

Two threaded pins are then screwed in with a tightening torque such that a secure contact with the copper conductor of the HVI® conductor can be realized. After the mounting of the head piece or the connection element, a shrinking around the appropriate mounting areas has to be performed. The shrinking therearound is absolutely necessary for a protection against mechanical, environmentally induced or chemical influences. It is essential to observe a specified shrinking temperature. Excessive shrinking temperatures must not be applied in the area in which a shrinking around the HVI® conductor is carried out. If the shrinking temperature is too high, there is a risk that the semiconductive jacket of the HVI® conductor will be impaired or destroyed.

The lightning current arrester device according to DE 20 2018 101 038 U1 is based on an air-termination system to be connected to an electrical conductor of an insulated arrester device and finally to the grounding system. The electrical conductor is surrounded by an insulation.

A connection cap made of an electrically conductive material is present at the end region of the insulation facing the air-termination system and the additional layer surrounding the latter. The air-termination system and/or the electrical conductor can be connected to the additional layer with the aid of this connection cap.

Furthermore, the connection cap serves to make contact with the electrical conductor of the insulated down conductor.

The connection cap is configured in a sleeve-like manner and can be applied with the sleeve jacket onto the insulation along with the additional layer present there. The sleeve base serves as an insertion limit for the insulation.

A blind hole in which the stripped end of the conductor is inserted adjoins the sleeve base. Stud bolts which contact the stripped end of the appropriate conductor with their end projecting into the blind hole threadingly engage through the connection cap in the region of the blind hole.

To avoid the use of adhesive or similar means for fixing the conductor in the sleeve, it is now proposed according to DE 20 2018 101 038 U1 to integrally form a positive-engagement part on the inside of the sleeve jacket of the connection cap, which by deformation of the insulation of the down conductor is adapted to be positively connected to this insulation in the desired mounting position. The positive-engagement part is also intended to press and hold the additional layer into the deformation of the insulation.

In a preferred embodiment, the positive-engagement part is realized by at least one rib which forms a thread and projects from the inside of the sleeve jacket of the connection cap.

On the solution side, the principle of DE 20 2018 101 038 U1 thus originates from the idea of deforming the insulation to realize the desired positive engagement. This is intended to ensure a tensile connection of the corresponding elements and an electrical contact. The positive-engagement part is intended to penetrate radially into the material of the insulation in the desired mounting position.

Accordingly, the device there is configured such that due to the positive-engagement part, when it causes a deformation of the insulation and engages therein in a positive engagement in the desired mounting position, the additional layer forming a semiconductive layer is also entrained and subject to a pressing into the deformation of the insulation.

However, it has been shown in practical application that when implementing the solution according to DE 20 2018 101 038 U1, considerable forces have to be applied during the screw-on connection between the insulated down conductor and the connection cap there. Furthermore, it cannot be ruled out that during the connection by a rotational motion, the positive-engagement part cuts into the semiconductive sheathing or the insulation and thus damages these parts.

Based on the aforementioned, it is therefore the object of the invention to specify a further developed connection head piece for contacting an insulated down conductor in the external lightning protection, which on the one hand permits a secure contacting of the semiconductive layer of the insulated down conductor with the connection head piece and in which a compensation of tolerances with respect to the diameter-side dimensions of the insulated down conductor is also carried out, and the electrical contact between the connection head piece and the semiconductive layer is maintained under all environmental conditions and influences such as climate, changes in humidity temperature and the like. The solution to be specified is finally intended to prevent the necessary electrical connection from being subject to a functionally impairing deterioration as a result of a flowing away of the plastic material of the insulated down conductor.

The object of the invention is achieved by the formation of a connection head piece in accordance with the combination of features set forth herein.

Accordingly, an electrically conductive, in particular metallic connection head piece for contacting an insulated down conductor in the external lightning protection is taken as a basis.

Here, the connection head piece ensures on the one hand the necessary electrical and lightning current-carrying connection between the actual conductor of the insulated down conductor, but also the necessary contacting of the field control layer of the insulated down conductor, i.e. the corresponding semiconductive sheathing layer.

The connection head piece consists of a sleeve-shaped structure having an axially extending, first inner diameter section adjusted to the outer diameter or the cross-section of the inserted insulated down conductor for receiving a corresponding end of the insulated down conductor, and having a second inner diameter section extending axially adjacent thereto and adjusted to the outer diameter or cross-section of a stripped, exposed conductor end of the insulated down conductor. Furthermore, means for fastening the stripped, exposed conductor end in the second inner diameter section are present. The second inner diameter section can be realized as a through hole or also as a blind hole or the like. A known head piece, a connection for an air-termination rod or a connection for clipping on metallic components of an external lightning protection system can be located on the second inner diameter section.

According to the invention, a static friction-generating means is formed in the first inner diameter section of the sleeve and flexibly projects into the interior of the sleeve such that upon insertion of the down conductor against the resistance of the static friction-generating means, a nonpositive fit is established between an outer sheath of the insulated down conductor and the sleeve. The fact that the static friction-generating means flexibly projects into the sleeve interior allows a tolerance compensation in relation to the respectively supplied insulated down conductor. Furthermore, the flexibility ensures that a necessary electrical contact with the inner jacket of the sleeve is maintained even in case of a possible flowing away of plastic components of the insulated down conductor.

Surprisingly, a conductive or semiconductive sheathing of the arrangement of insulated down conductor and connection head piece in the corresponding transition area, which would otherwise be necessary, can be dispensed with such that the mounting process on site is simplified and the relevant standards are observed.

In a preferred further development of the invention, the sleeve has in the first inner diameter section a sleeve wall which includes a recess for receiving a spring element as a static friction-generating means.

It is within the meaning of the invention that here, the sleeve wall may also have a plurality of recesses for receiving a corresponding multitude of spring elements as static friction-generating means. For the arrangement and formation of a plurality of spring elements, it is decisive that the largest possible surface section of the semiconductive layer of the insulated down conductor comes into contact with the metallic inner wall of the sleeve. When considering the cross-section of the sleeve, an arrangement of spring elements in a position between substantially 10.00 o'clock and 14.00 o'clock is conceivable.

The spring element(s) may be fixed in a clamping manner to the recess(es). When inserting the insulated down conductor into the sleeve, the spring element(s) is/are at least partially displaced into the recess, i.e. pushed back, so that the force required upon insertion of the insulated down conductor into the sleeve is kept within limits and a secure contacting and adhesion is still ensured.

The spring element(s) may be configured as a leaf spring, the longitudinal extension of the respective leaf spring running in the axial direction of the sleeve to prevent a destroying cutting in, i.e. damage, in particular of the semiconductive layer of the insulated down conductor.

The spring element(s) may be configured so as to be adapted to be clipped or to latch into the recess.

To this end, the corresponding spring elements have at their long side ends clamp-like projections for engaging around corresponding sections of the sleeve wall in the area of the recess.

The one or more static friction-generating means may also be configured as a tongue section of a punching in the sleeve material, one tongue end projecting radially into the sleeve interior.

The correspondingly free tongue end(s) extend(s) in the longitudinal direction, i.e. axially in the first inner diameter section. Alternatively, the free tongue ends may extend over an inner peripheral section of the sleeve, following the sleeve radius.

Basically, the clear inner diameter of the first inner diameter section is selected to be slightly larger than the outer diameter of the insulated down conductor to be received.

The static friction-generating means may be formed in one piece but also in several pieces. This means that according to one example, a spring element may be formed as static friction-generating means from an undulated spring, a slotted leaf spring or similar configuration.

The spring element can be made of an electrically conductive, in particular metallic spring material. However, it is also possible to manufacture the spring element from a plastic material. In this case, the decisive factor for the contacting is the pressing effect, i.e. the generation of static friction between the appropriate outer jacket of the insulated down conductor and the inner jacket or the inner side of the corresponding sleeve section.

The invention will be explained in more detail below with reference to example embodiments and with the aid of figures, in which.

The basic structure of an exemplary connection head piece can be seen in the representations according to FIG. 1A-1B, or 4A-4B and 5A-5B.

Figure 1A:
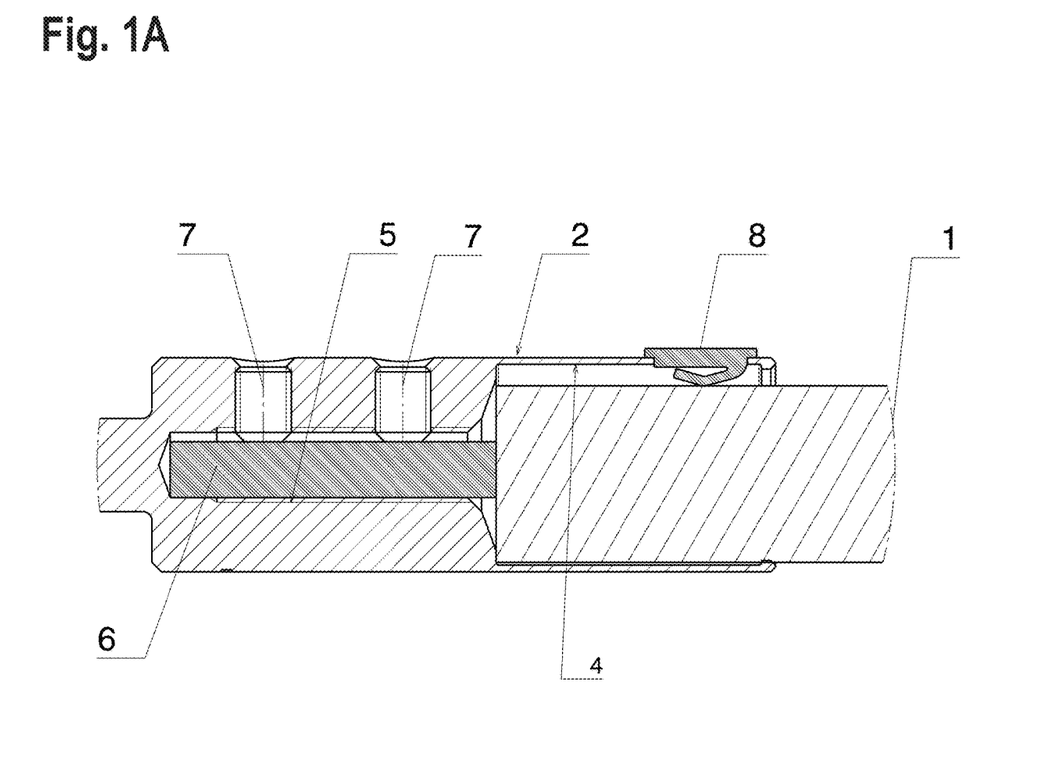
FIGS. 1A-1B show a longitudinal and cross-sectional representation of an example embodiment for a connection head piece with an insulated down conductor received therein which has a stripped conductor section fixed in a second inner diameter section of the sleeve of the connection head piece, and a static friction-generating means formed as a spring element.
Figure 1B:
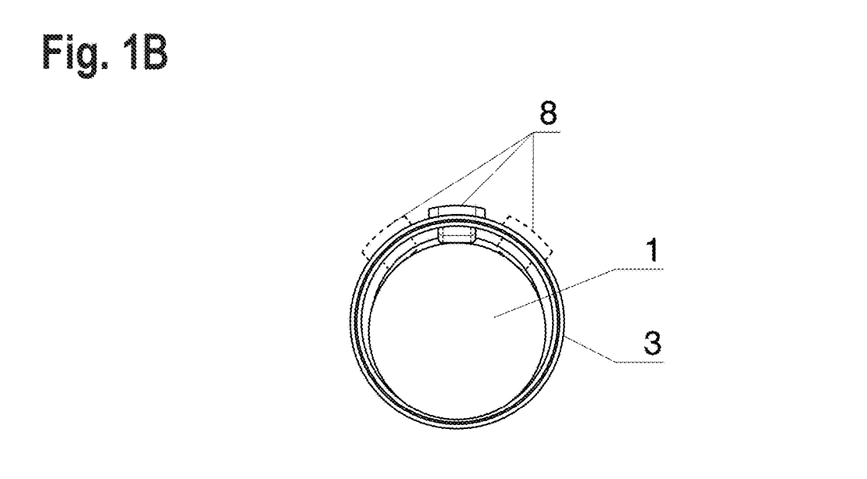

The connection head piece 2 used for making contact with an insulated down conductor 1 consists of a sleeve 3.

The sleeve 3 has a first, axially extending inner diameter section 4 which is adjusted to the outer diameter or cross-section of the insulated down conductor 1. This first, axially extending inner diameter section 4 receives a corresponding end of the insulated down conductor 1 in the interior thereof.

Furthermore, the sleeve has a second inner diameter section 5 extending axially adjacent thereto.

It is adjusted to the outer diameter or the cross-section of a stripped, exposed conductor end 6 of the insulated down conductor 1.

Furthermore, setscrews 7 are provided, for example, as means for fixing the stripped, exposed conductor end 6 in the second inner diameter section 5.

A static friction-generating means formed as a spring element 8 is present in the first inner diameter section 4 of the sleeve 3.

In accordance with the longitudinal sectional representation of FIGS. 1A-1B, this spring element 8 flexibly projects into the interior of the sleeve such that upon insertion of the down conductor 1, a nonpositive fit is established between an outer sheath there (not shown in detail) of the insulated down conductor 1 and the sleeve 3.

In this respect, the sleeve wall has a recess 10 in the region of the first inner diameter section 4 for receiving the spring element 8 as the force-generating means.

The cross-sectional representation of FIGS. 1A-1B, lower illustration, makes it clear that various positions between essentially 10.00 o'clock and 14.00 o'clock can be selected for the recess including the spring element 8 inserted there. It is in any case decisive that the corresponding end of the insulated down conductor along with the outer jacket thereof comes into intimate electrical contact with the inner jacket of the sleeve or the connection head piece.

Figure 2A:
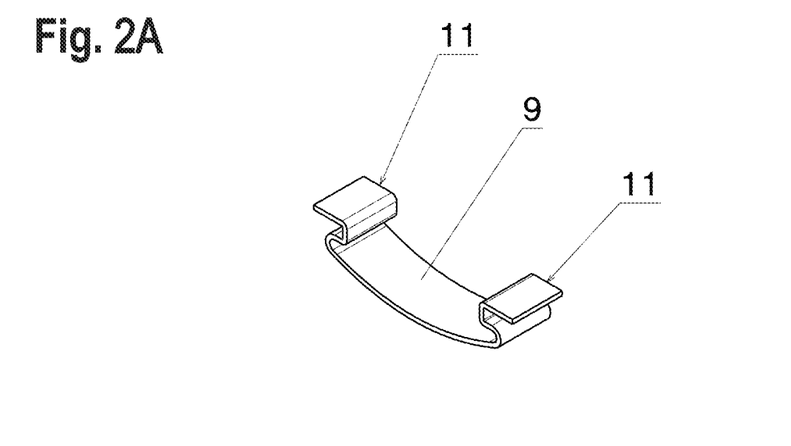
FIGS. 2A-2C show a lateral view, a top view and a perspective representation of a spring element as a static friction-generating means.
Figure 2B:
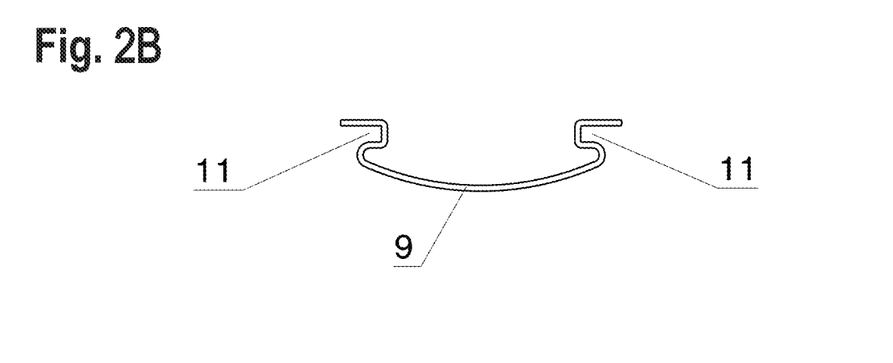
Figure 2C:
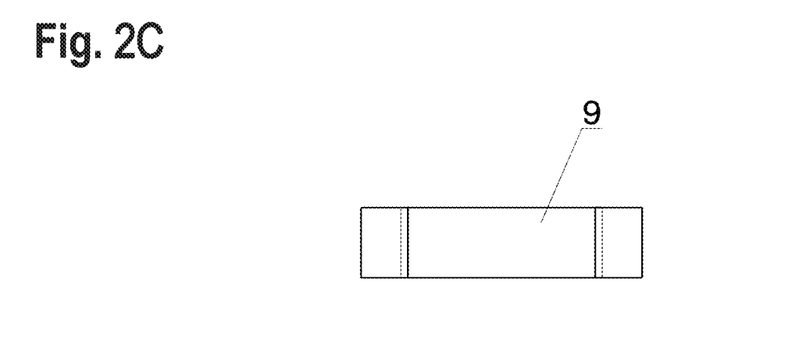
Figure 3A:
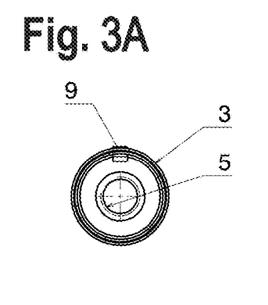
FIGS. 3A-3I show several exemplary front views, longitudinal sectional representations and perspective representations of a connection head piece having a first, axially extending inner diameter section along with a recess for receiving a spring element, as shown in FIGS. 2A-2C, the diameter specifications representing embodiments of connection head pieces for insulated down conductors having different diameters. Furthermore, the exemplary dimensional specifications clearly show to what extent the clear inner diameter of the first inner diameter section of the sleeve is selected to be slightly larger than the outer diameter of the respective insulated down conductor to be received.
Figure 3B:
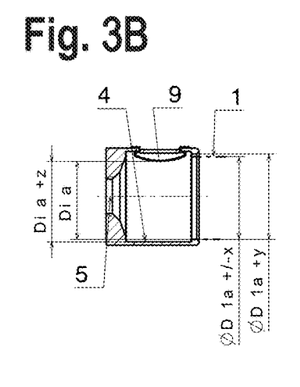
Figure 3C:
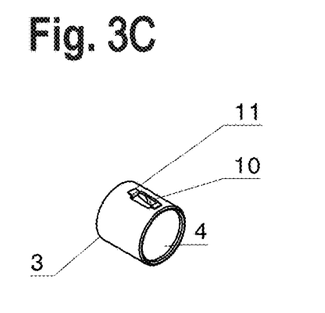
Figure 3D:
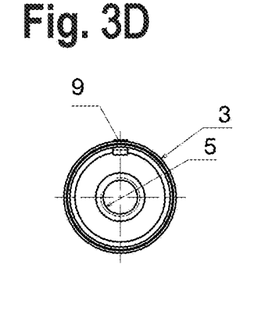
Figure 3E:
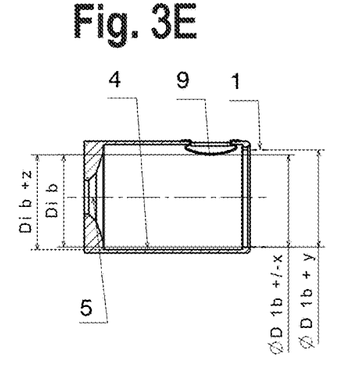
Figure 3F:
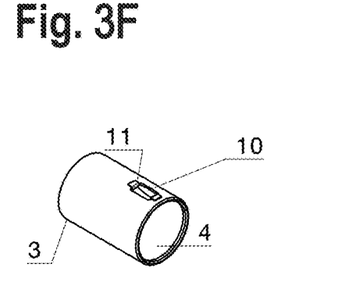
Figure 3G:
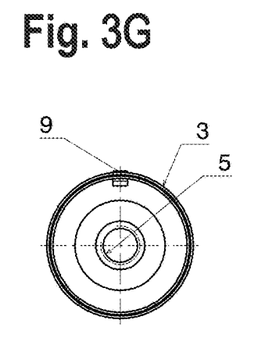
Figure 3H:
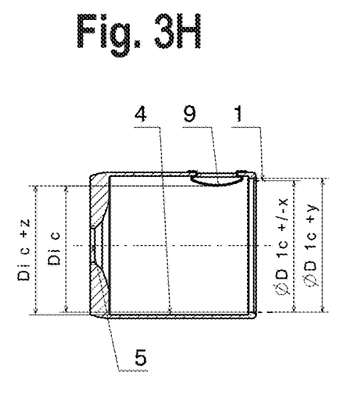
Figure 3I:
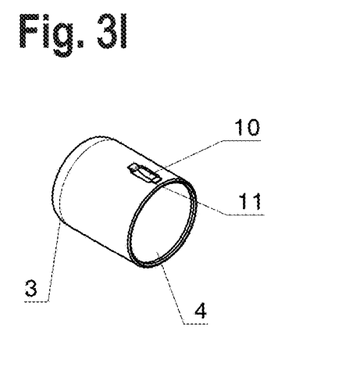

The views according to FIGS. 2A-2C show an exemplary spring element 9, here preferably of metallic design.

This spring element 9 is realized as a leaf spring, the longitudinal extension of the leaf spring running in the axial direction to the sleeve 3 (cf. FIGS. 3A-3I).

It is also apparent for a person skilled in the art from the illustrations according to FIGS. 3A-3I how the respective spring element 9 is clamp-fixed in the sleeve recess 10 and how the spring element 9 is partially pushed back, i.e. displaced into the recess 10 when introducing or inserting the insulated down conductor into the sleeve.

The spring element 9 is adapted to be clipped or to latch into the recess 10.

In this respect, the spring element 9 includes clamp-like projections 11 at the long side ends thereof, which serve to engage around corresponding sections of the sleeve wall in the region of the recess 10.

In accordance with the representations of FIGS. 4A-4B and 5A-5B, the force-generating means may also be formed as a tongue section 12 of a punching of the sleeve material, a free tongue end 13 projecting radially in the direction of the interior of the sleeve.

Figure 4A:
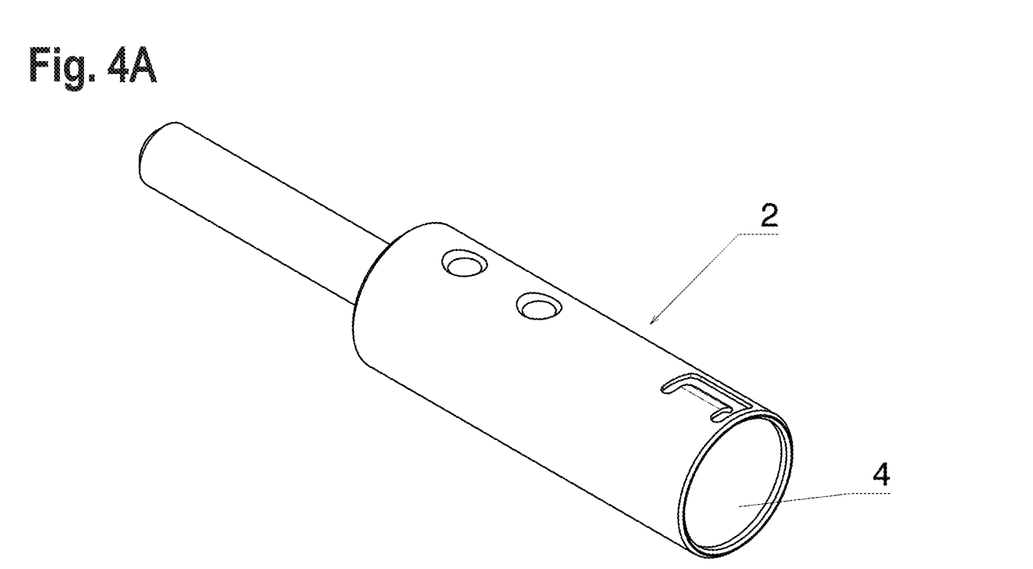
FIGS. 4A-4B and 5A-5B show perspective representations and detailed representations of a further embodiment for forming a static friction-generating means in the form of a punching of the sleeve material to form a tongue section, wherein a free tongue end projects radially in the direction of the sleeve interior, and according to FIGS. 4A-4B, the free tongue end extends in the longitudinal direction, i.e. axially in the first inner diameter section, or according to FIGS. 5A-5B, in which the free tongue end extends over an inner peripheral section of the sleeve, following the sleeve radius.
Figure 4B:
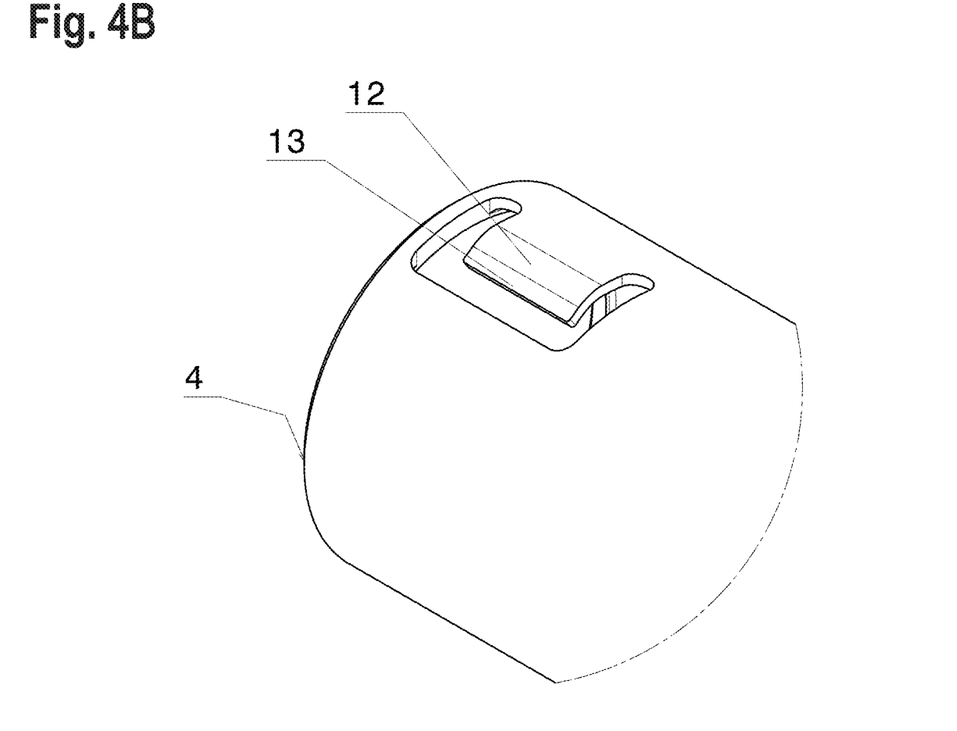

The free tongue end 13 may be located in the longitudinal direction, i.e. axially in the first inner diameter section 4 of the sleeve, as clearly shown in FIGS. 4A-4B.

Figure 5A:
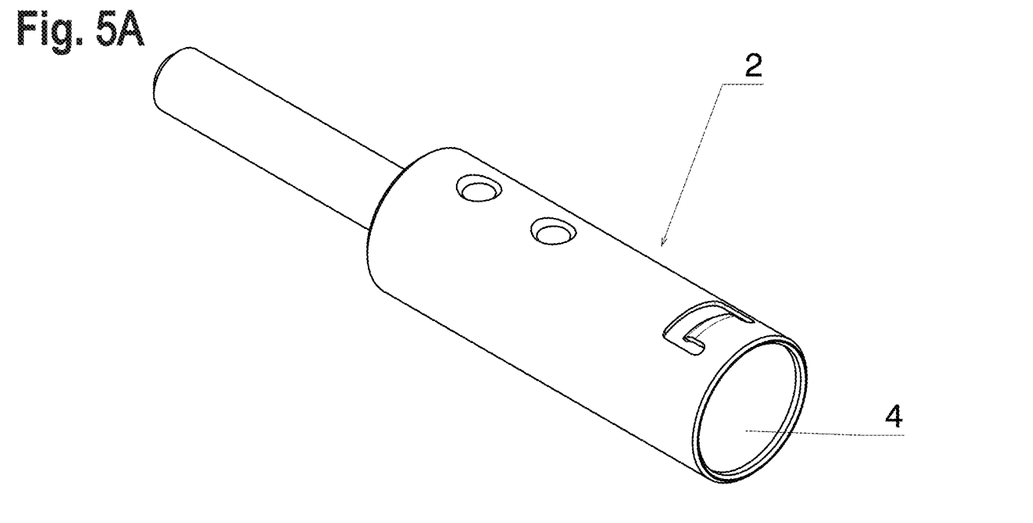
Figure 5B:
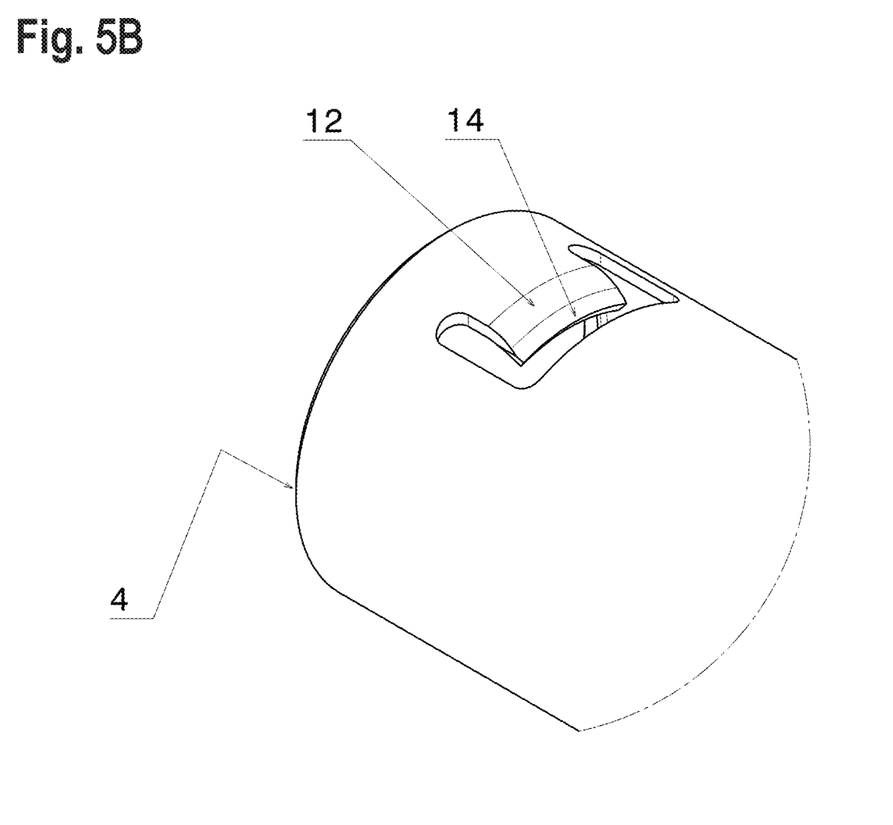

Alternatively, it is possible to realize the punching as illustrated in FIGS. 5A-5B. In this case, the free tongue end 14 extends radially following the sleeve radius into the interior of the first inner diameter section 4 of the sleeve.

The cross-sectional, longitudinal sectional and perspective views according to FIGS. 3A-3I show how the clear inner diameter of the first inner diameter section 4 of the sleeve has to be selected to be slightly larger than the outer diameter of an insulated down conductor of a different diameter (not shown there), and to what extent the spring element shown there is allowed to project into the first inner diameter section of the sleeve such that on the one hand, the insulated down conductor can easily be inserted into the connection head piece without tools and, on the other hand, the necessary static friction-induced nonpositive fit is maintained under all environmental and application conditions.

As already explained, the spring element 8 may be formed as a leaf spring in one example, the longitudinal extension of such a spring element running in the axial direction of the sleeve 3. Alternatively, it is also possible to design a flexible formed part, for example formed as a wire structure, radially or tangentially with respect to the sleeve 3, the decisive factor finally being that a relevant region of the element flexibly projects into the interior of the sleeve such that upon insertion of the down conductor 1, a corresponding nonpositive fit is established between an outer sheath of the insulated down conductor 1 and the sleeve 3.

The invention claimed is:

1. A connection head piece for contacting an insulated down conductor in an external lightning protection, comprising a sleeve having an axially extending, first inner diameter section adjusted to an outer diameter or cross-section of the insulated down conductor for receiving one end of the insulated down conductor, and having a second inner diameter section extending axially adjacent thereto and adjusted to an outer diameter or cross-section of a stripped, exposed conductor end of the insulated down conductor, and means for fastening the stripped, exposed conductor end in the second sleeve section, wherein a static friction-generating means is formed in the first inner diameter section of the sleeve and flexibly projects into the interior of the sleeve such that a static friction fit is established between an outer sheath of the insulated down conductor and the sleeve upon insertion of the down conductor, wherein the sleeve has a sleeve wall which includes a recess receiving a spring element as the static friction-generating means, and wherein the spring element is fixed in a clamping manner to or in the recess, and in which the spring element is partially displaced into the recess upon insertion of the insulated down conductor into the sleeve.

2. The connection head piece according to claim 1, wherein
the spring element is configured as a leaf spring, a longitudinal extension of the leaf spring running in an axial direction of the sleeve.

3. The connection head piece according to claim 1, wherein
the spring element is adapted to be clipped or to latch into the recess.

4. The connection head piece according to claim 1, wherein
on long side ends of the spring element, the spring element has clamp-like projections for engaging around sections of the sleeve wall in an area of the recess.

5. The connection head piece according to claim 1, wherein
a clear inner diameter of the first inner diameter section is selected to be slightly larger than the outer diameter of the insulated down conductor to be received.

6. The connection head piece according to claim 1, wherein
the static friction-generating means is configured in one piece.

7. The connection head piece according to claim 1, wherein
the spring element is electrically conductive or is made of an insulating material.

8. The connection head piece according to claim 1, wherein
the recess is configured as an offset of a jacket material of the sleeve or as an opening.

9. The connection head piece according to claim 1, wherein the static friction-generating means is configured in several pieces.

10. A connection head piece for contacting an insulated down conductor in an external lightning protection, comprising a sleeve having an axially extending, first inner diameter section adjusted to an outer diameter or cross-section of the insulated down conductor for receiving one end of the insulated down conductor, and having a second inner diameter section extending axially adjacent thereto and adjusted to an outer diameter or cross-section of a stripped, exposed conductor end of the insulated down conductor, and means for fastening the stripped, exposed conductor end in the second sleeve section,
wherein
a static friction-generating means is formed in the first inner diameter section of the sleeve and flexibly projects into the interior of the sleeve such that a static friction fit is established between an outer sheath of the insulated down conductor and the sleeve upon insertion of the down conductor, wherein the static friction-generating means is formed as a tongue section of a punching of the sleeve jacket, a free tongue end projecting radially in the direction of the sleeve interior.

11. The connection head piece according to claim 10, wherein the free tongue end extends in a longitudinal direction, wherein the free tongue end extends axially in the first inner diameter section or over an inner peripheral section of the sleeve following a sleeve radius.

12. A connection head piece for contacting an insulated down conductor in an external lightning protection, comprising a sleeve having an axially extending, first inner diameter section adjusted to an outer diameter or cross-section of the insulated down conductor for receiving one end of the insulated down conductor, and having a second inner diameter section extending axially adjacent thereto and adjusted to an outer diameter or cross-section of a stripped, exposed conductor end of the insulated down conductor,
wherein the sleeve is formed integrally so as to be made in one piece,
wherein a flexible part is located in the first inner diameter section of the integrally formed sleeve and wherein a relevant region of the flexible part flexibly projects into the interior of the sleeve such that upon insertion of the down conductor the relevant region of the flexible part is pushed back by the down conductor and a static friction fit is established between an outer sheath of the insulated down conductor and the sleeve.

* * * * *